Nov. 30, 1948.          F. L. DAVIS          2,455,237
                        CARGO BLANKET
Filed Oct. 29, 1946                          3 Sheets-Sheet 2
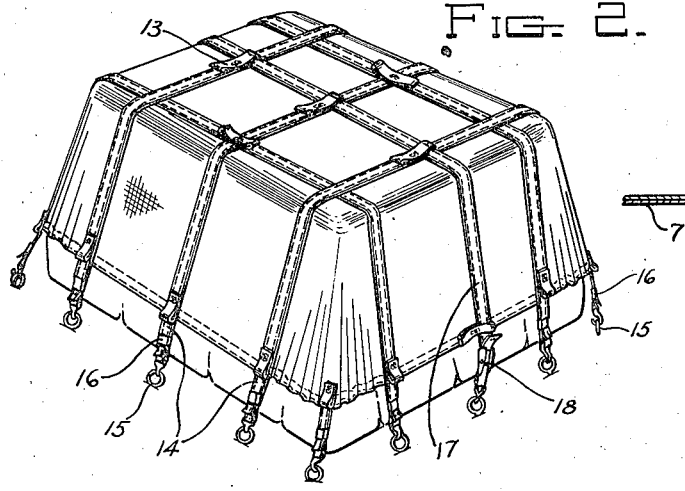
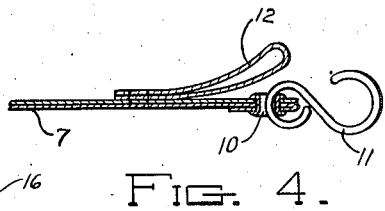
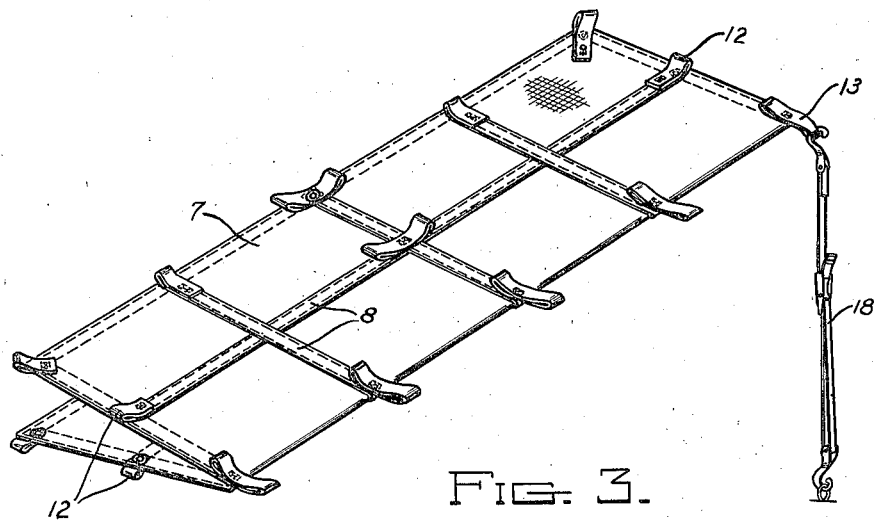
INVENTOR.
FRANK L. DAVIS
BY
ATTORNEY Nov. 30, 1948.   F. L. DAVIS   2,455,237
CARGO BLANKET
Filed Oct. 29, 1946   3 Sheets-Sheet 3
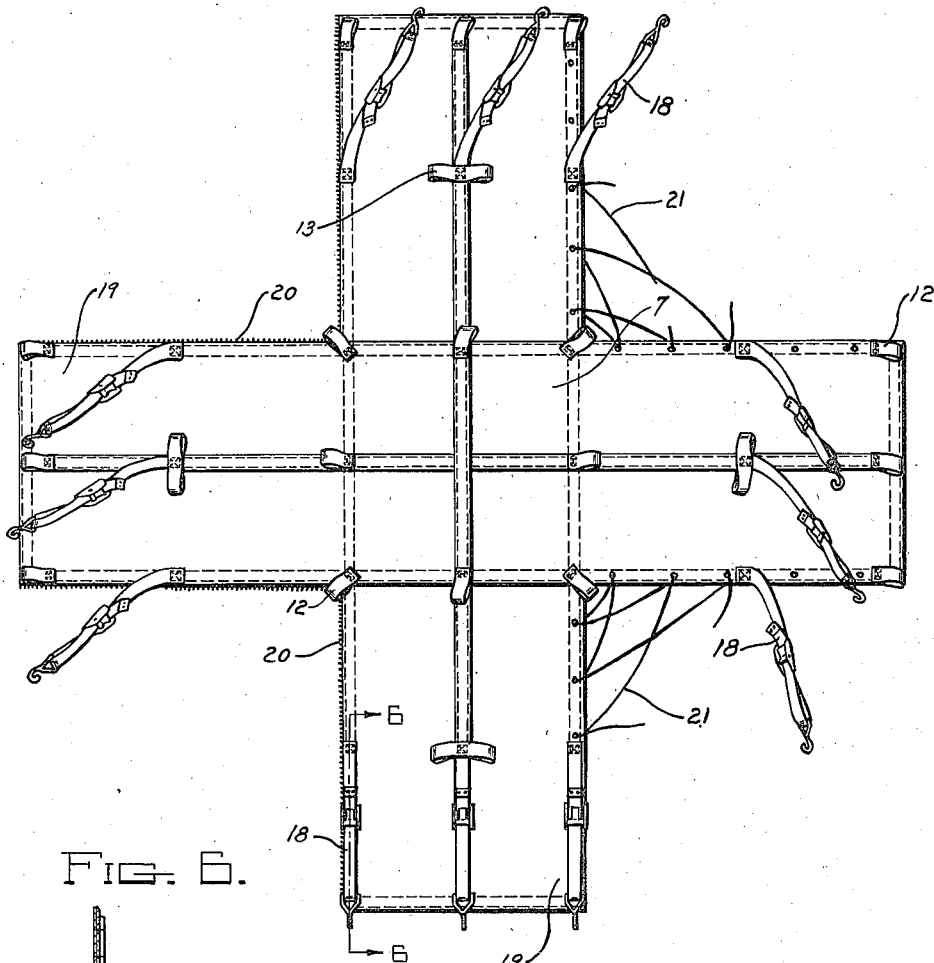
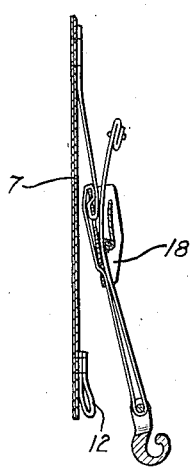
INVENTOR.
FRANK L. DAVIS
BY
ATTORNEY.

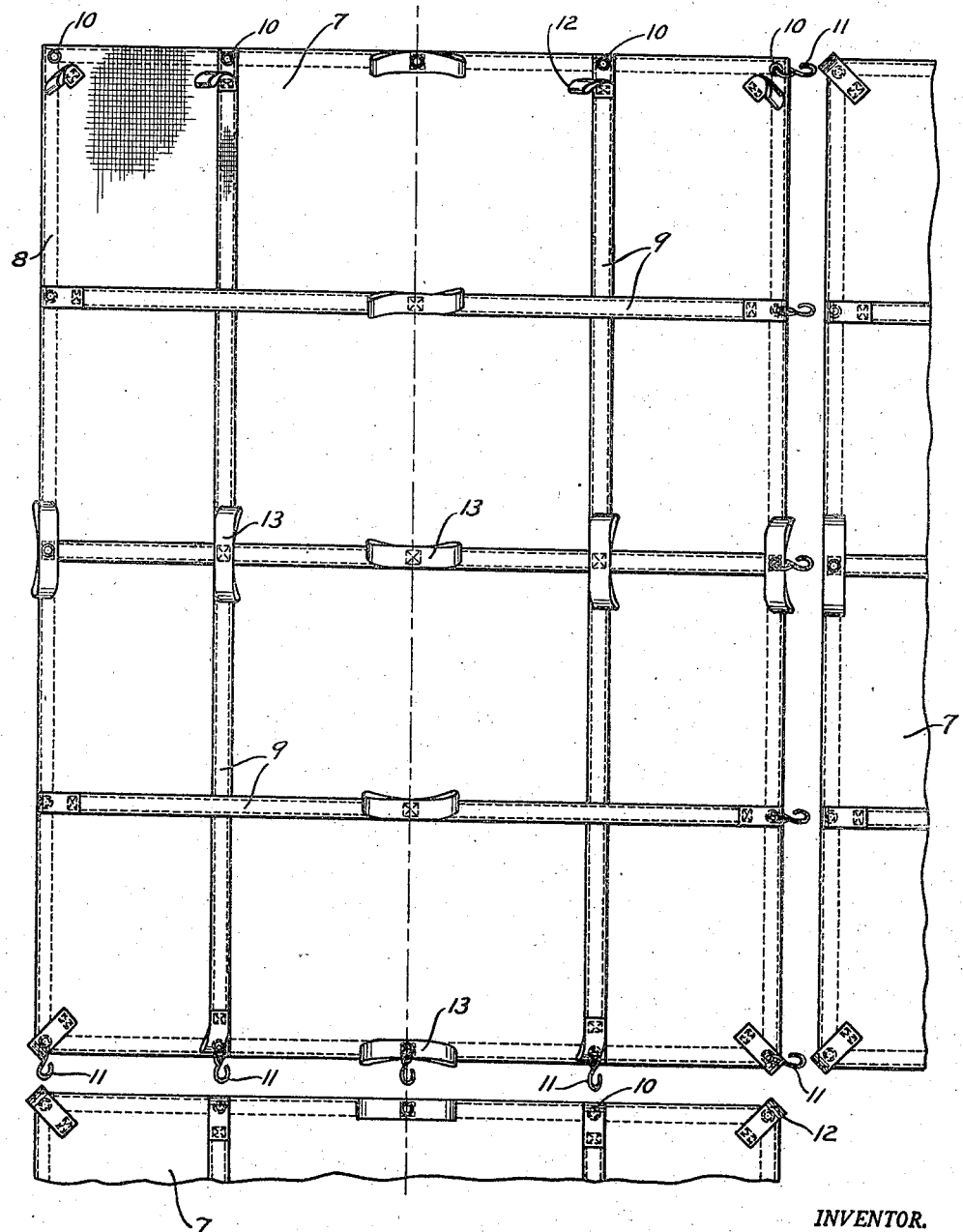

Patented Nov. 30, 1948

2,455,237

UNITED STATES PATENT OFFICE 2,455,237

CARGO BLANKET

Frank L. Davis, College Point, N. Y.

Application October 29, 1946, Serial No. 706,316

5 Claims. (Cl. 248—361)

The invention here disclosed is known as a cargo blanket because of its character as a cover for protecting and securing cargo in aircraft and other carriers.

Special objects of the invention have been to provide a tie-down blanket construction universally adaptable to varying cargo conditions.

Thus it has been a purpose of the invention to provide a securing cover which could be extended or reduced to secure greater or lesser loads, varied as required to fit loads of different shape and which in all such uses would be amply strong and hold the cargo firmly and securely.

Further special objects have been to provide a tie-down blanket which could be quickly and easily adjusted at any time to hold a shifting load or to take up any slack or the like.

Other desirable objects and the novel features through which the purposes of the invention have been attained are set forth or will appear in the course of the following specification.

The drawings accompanying and forming part of the specification illustrate certain present embodiments of the invention. Structure, however, may be modified and changed in various ways, all within the true intent and broad scope of the invention as hereinafter defined and claimed.

Fig. 1 in the drawings is a plan view showing one section of blanket with portions of two other sections in position to be joined to one side and to one end of the same;

Fig. 2 is a perspective view showing one section of blanket secured to hold down a load;

Fig. 3 is a perspective view showing how a section may be folded to convert it to half size and leave it fully useful as such;

Fig. 4 is an enlarged broken sectional detail of one corner of the blanket;

Fig. 5 is a broken plan view of a modified form of blanket; and

Fig. 6 is a broken part sectional detail of one of the adjustable take-ups.

In Fig. 1 a blanket unit or section is indicated at 7 in the form of a rectangle of strong canvas duck, nylon or the like, having hemmed, taped or otherwise strengthened edges, as indicated at 8, and reenforced across the body of the same by crossed strips of webbing 9 stitched or otherwise suitably secured over the same.

Grommets 10 through the webbing at the edges of the blanket and at the corners provide anchorages for S-hooks 11 or other forms of fastenings.

Strap loops 12 secured over the strips of webbing, near the edges of the blanket, provide protective covers over the grommets and hooks, form grips for pulling the blanket into position and provide for passage of strips of webbing, straps, ropes, wires or other fastenings which might be desirable for further securing a load.

Across the center lines of the blanket double strap loops 13 are shown which may be utilized as indicated in Fig. 3, when the blanket is folded along the center lines to reduce it to half or quarter size, in which event one of each of the double loops at the exposed folded edge or edges will be available for securing purposes.

Fig. 1 shows how the hooks 11 may be applied to only one end and side of the blanket, the lower end and right-hand side in this case, to serve as the fastenings for securing this one blanket or section to the empty or unhooked ends and sides of adjoining blanket sections. In the illustration the upper end of a second blanket section is shown ready to be joined to the lower end of the first section by the hooks on such end of that section and a third section at the side ready to be joined to the first section by hooks along the right-hand side of the first section. By this arrangement as many sections may be joined together as needed, by simply engaging the free ends of the hooks 11 on one section into the grommets 10 or loops 12 on the edge of an adjoining section.

The reenforcing straps 8 may terminate at or be extended beyond the edges of the blanket. If terminated at the edges the ends may be turned back and secured to form the loops 12, as indicated in Fig. 3.

If extended beyond the edges of the covering material, as indicated at 14 in Fig. 2, the straps may be employed to tie down the load as by securing them to hold-down bolts 15 or the like, and equipping them with suitable take-up buckles 16.

Fig. 2 shows how one or more lines of webbing 17 may be run one way or another across the top of the load through the double loops 13. These extra lengths of webbing may have adjustable take-ups at the ends of the same, as indicated at 18, similar to those disclosed in copending patent application Serial No. 587,340, filed April 9, 1945, now Patent 2,442,266.

The shape of the blanket may vary to suit different loads. By way of example it may be made as in Fig. 5, with flap extensions 19 at the four sides of the same, to fold down over the load and form a tight enclosure. Slide fasteners 20 or laced fastenings 21 may be provided for drawing the side flaps closely together at the corners. The cord lacing may be preferred where the cover is to be secured more or less permanently, and the slide fastener be used possibly at only one side where there may be a requirement for quick inspection facilities or for easy removal of certain packages or portions of the load.

The adjustable take-ups at the ends of the tie-down straps enable the blankets to be quickly attached to load-carrying pallets or the like and to be tightened down if the load settles or starts to shift. The S-hooks may be used to fasten the blanket to anchorages along the sides of cargo transporting aircraft, to cargo bins or to any other available fastenings.

What is claimed is:

1. A cargo blanket comprising a section of cargo holding fabric having fold down extensions at the sides of the same and provided with means for tensioning said extensions downwardly in cargo confining relation.

2. A cargo blanket comprising a section of cargo holding fabric having fold down extensions at the sides of the same and provided with means for tensioning said extensions downwardly in cargo confining relation and means for connecting the edges of adjoining extensions in such relation.

3. A cargo blanket comprising a section of cargo holding fabric having loops of webbing at the corners and at spaced points along the sides of the same and straps of webbing extending across the section in line with said loops.

4. A cargo blanket comprising a section of cargo holding fabric having loops of webbing at the corners and at spaced points along the sides of the same and straps of webbing extending across the section in line with said loops, said loops being formed by doubled-back portions of said straps.

5. A cargo blanket comprising a section of cargo holding fabric having means for variably fastening down the edges of the same and provided with adjustable pull-down straps connected with the cargo holding fabric inwardly of said edges of the blanket and thereby enabling the blanket to be shortened and pulled down over cargo independently of said fastening down of the edges of the same.

FRANK L. DAVIS.

REFERENCES CITED

The following references are of record in the file of this patent:

UNITED STATES PATENTS

| Number | Name | Date |
| --- | --- | --- |
| 1,871,101 | Waltz | Aug. 9, 1932 |
| 1,871,570 | Weber | Aug. 16, 1932 |
| 2,353,017 | Denton | July 4, 1944 |
| 2,372,967 | Martin | Apr. 3, 1945 |